US009724697B2

(12) United States Patent
Steed et al.

(10) Patent No.: US 9,724,697 B2
(45) Date of Patent: Aug. 8, 2017

(54) WEAR INDICATION DEVICES, AND RELATED ASSEMBLIES AND METHODS

(71) Applicant: Dash LLC, West Valley City, UT (US)

(72) Inventors: Daniel J. Steed, West Valley City, UT (US); Shiloh D. Poulsen, Magna, UT (US)

(73) Assignee: Dash LLC, West Valley City, UT (US)

( * ) Notice: Subject to any disclaimer, the term of this patent is extended or adjusted under 35 U.S.C. 154(b) by 0 days.

(21) Appl. No.: 14/791,081

(22) Filed: Jul. 2, 2015

(65) Prior Publication Data

US 2017/0003208 A1 Jan. 5, 2017

(51) Int. Cl.
*G01N 3/56* (2006.01)
*B02C 4/00* (2006.01)

(52) U.S. Cl.
CPC ...................................... *B02C 4/00* (2013.01)

(58) Field of Classification Search
CPC .... G01N 3/56; G01L 3/18; G01L 3/16; G01L 3/00; G01L 1/22
USPC ........... 73/7, 9, 862.12, 862.09, 862.08, 862
See application file for complete search history.

(56) References Cited

U.S. PATENT DOCUMENTS

| | | | | |
|---|---|---|---|---|
| 4,510,793 A * | 4/1985 | Ploegaert | G01B 17/02 | 73/597 |
| 5,176,053 A * | 1/1993 | Alvelid | B23B 27/145 | 374/141 |
| 6,208,128 B1 * | 3/2001 | Braconnier | G01B 7/06 | 324/700 |
| 6,386,237 B1 * | 5/2002 | Chevalier | F16L 55/1686 | 138/97 |
| 7,113,125 B2 * | 9/2006 | Le Sesne | G01F 23/2845 | 342/124 |
| 7,172,144 B1 * | 2/2007 | Slater | B02C 17/1805 | 241/101.2 |
| 7,677,079 B2 * | 3/2010 | Radziszewski | G01N 3/56 | 73/7 |
| 8,384,266 B2 * | 2/2013 | Fish | H01R 39/58 | 310/239 |

(Continued)

FOREIGN PATENT DOCUMENTS

| | | |
|---|---|---|
| GB | 2015099 A | 9/1979 |
| GB | 2255145 A | 10/1992 |

(Continued)

OTHER PUBLICATIONS

International Search Report for International Application No. PCT/US2016/040784, dated Sep. 12, 2016, 3 pages.

(Continued)

*Primary Examiner* — Michael A Lyons
*Assistant Examiner* — Nigel Plumb
(74) *Attorney, Agent, or Firm* — TraskBritt

(57) ABSTRACT

A wear indication device comprises an outer body and a sensor configured to detect and indicate wear to the outer body. The outer body exhibits an opening extending at least partially therethrough and comprises a stem region, and a head region integral with the stem region and extending outwardly beyond a lateral periphery of the stem region. The sensor is positioned within the opening and comprises an output device. An assembly, and a method of detecting wear to a component of an assembly are also described.

20 Claims, 6 Drawing Sheets

(56) References Cited

U.S. PATENT DOCUMENTS

| | | | | |
|---|---|---|---|---|
| 8,775,099 | B2 * | 7/2014 | Wagner | B28D 7/00 175/39 |
| 9,476,689 | B2 * | 10/2016 | Steed et al. | G01B 7/02 |
| 2003/0175090 | A1 * | 9/2003 | Port-Robach | G01B 7/284 411/14 |
| 2007/0271804 | A1 * | 11/2007 | Kuhman | G01N 3/56 33/544.4 |
| 2008/0023225 | A1 * | 1/2008 | Lynde | B24B 49/08 175/39 |
| 2009/0061542 | A1 * | 3/2009 | Patrick | G01N 27/20 438/10 |
| 2011/0037983 | A1 * | 2/2011 | Davies | G01M 11/08 356/445 |
| 2012/0242355 | A1 * | 9/2012 | Kato | G01N 27/125 324/700 |

FOREIGN PATENT DOCUMENTS

| | | | |
|---|---|---|---|
| JP | 2008223311 | A | 9/2008 |
| WO | 2005083411 | A1 | 9/2005 |
| WO | 2006081610 | A1 | 8/2006 |
| WO | 2007128068 | A1 | 11/2007 |

OTHER PUBLICATIONS

International Written Opinion for International Application No. PCT/US2016/040784, dated Sep. 12, 2016, 8 pages.

Global Business Reports, Chile Builds a Foundation for the Future—A resource-rich country deals with scarce commodities: energy, water and skilled labor., Engineering & Mining Journal, Apr. 2014, pp. 92-103.

Kouche et al., Ultrasonic Non-Destructive Testing (NDT) Using Wireless Sensor Networks, Procedia Computer Science, 10 (2012), pp. 136-143.

Steel et al., A Wireless Ultrasonic NDT Senor System, 16th WCNDT 2004—World Conference on NDT, Nov. 2014, vol. 9, No. 11, WCNDT 2004 Edition, 8 pages.

* cited by examiner

WEAR INDICATION DEVICES, AND RELATED ASSEMBLIES AND METHODS

TECHNICAL FIELD

The disclosure, in various embodiments, relates generally to devices, assemblies, and methods for use in processing a mined material, such as ore. More particularly, embodiments of the disclosure relate to wear indication devices, to assemblies including wear indication devices, and to methods of detecting wear to components of an assembly.

BACKGROUND

The mining industry frequently utilizes mills (e.g., rotary mills, ball mills, rod mills, semiautogenous mills, autogenous mills, etc.) to reduce the size of masses of material structures (e.g., ore) mined from the earthen formations. During use and operation of a mill, mined structures (and, optionally, other structures, such as balls, rods, etc.) are typically lifted and dropped back onto other mined structures to form relatively smaller structures through the resulting impacts. The process can be continuous, with relatively large mined material structures being delivered into one end of the mill and relatively smaller material structures (e.g., particles) of the mined material exiting an opposite end of the mill.

Generally, internal surfaces of a mill are covered (e.g., lined) with wear-resistant structures (e.g., liners, plates, etc.) sized and shaped to prevent damage to the mill resulting from contact between the mined material structures (and, optionally, other structures) and the internal surfaces of the mill during use and operation of the mill. The mined material structures contact and degrade (e.g., wear, abrade, etc.) the wear-resistant structures rather than the internal surfaces of the mill. The wear-resistant structures may be attached to the internal surfaces of the mill by way of bolts, and may be detached and replaced upon exhibiting significant wear. Thus, the wear-resistant structures can prolong the durability and use of the mill.

Unfortunately, it is often difficult to determine, particularly when continuous processing is employed, when the wear-resistant structures need to be replaced. Since the wear-resistant structures are located within the mill, the amount of wear exhibited by the wear-resistant structures is generally not easy to ascertain. Typically, the mill must be periodically shut down, cleaned, and physically inspected to determine if the wear-resistant structures need to be replaced. However, as commercial-scale mills are usually quite large and process significant amounts of mined material per hour, periodically shutting down and cleaning the mill to determine the amount of wear exhibited by the wear-resistant structures can be quite costly, inefficient, and impractical.

Accordingly, there remains a need for new devices, assemblies, and methods facilitating the simple and efficient detection and communication of the amount of wear exhibited by wear-resistant structures during mill operations.

BRIEF SUMMARY

Embodiments described herein include wear indication devices, assemblies including wear indication devices, and methods of detecting wear to a component of an assembly. For example, in accordance with one embodiment described herein, a wear indication device comprises an outer body, and a sensor configured to detect and indicate wear to the outer body. The outer body exhibits an opening extending at least partially therethrough and comprises a stem region, and a head region integral with the stem region and extending outwardly beyond a lateral periphery of the stem region. The sensor is positioned within the opening and comprises an output device.

In additional embodiments, an assembly comprises a vessel comprising a shell, at least one structure covering at least one internal surface of the shell of the vessel, one or more wear indication devices extending through and coupling the shell of the vessel and the at least one structure, and a receiving device. Each of the one or more wear indication devices independently comprises an outer body, and a sensor configured to detect and indicate wear to the outer body. The outer body exhibits an opening extending at least partially therethrough and comprises a stem region, and a head region integral with the stem region and extending outwardly beyond a lateral periphery of the stem region. The sensor is positioned within the opening and comprises an output device. The receiving device is positioned and configured to detect and receive output from the output device of at least one of the one or more wear indication devices.

In yet additional embodiments, a method of detecting wear to a component of an assembly comprises positioning at least one wear indication device within at least one opening extending through a shell of a vessel and at least one structure covering an internal surface of the shell. The at least one wear indication device comprises an outer body, and a sensor configured to detect and indicate wear to the outer body. The outer body exhibits an opening extending at least partially therethrough and comprises a stem region, and a head region integral with the stem region and extending outwardly beyond a lateral periphery of the stem region. The sensor is positioned within the opening and comprises an output device. The at least one structure is at least partially attached to the vessel using the at least one wear indication device. A portion of the at least one wear indication device is removed responsive to at least one of physical degradation and chemical degradation incurred during processing of a material with the vessel. An output is produced with the sensor of the at least one wear indication device after removing the portion of the at least one wear indication device.

DETAILED DESCRIPTION

Figure 1:
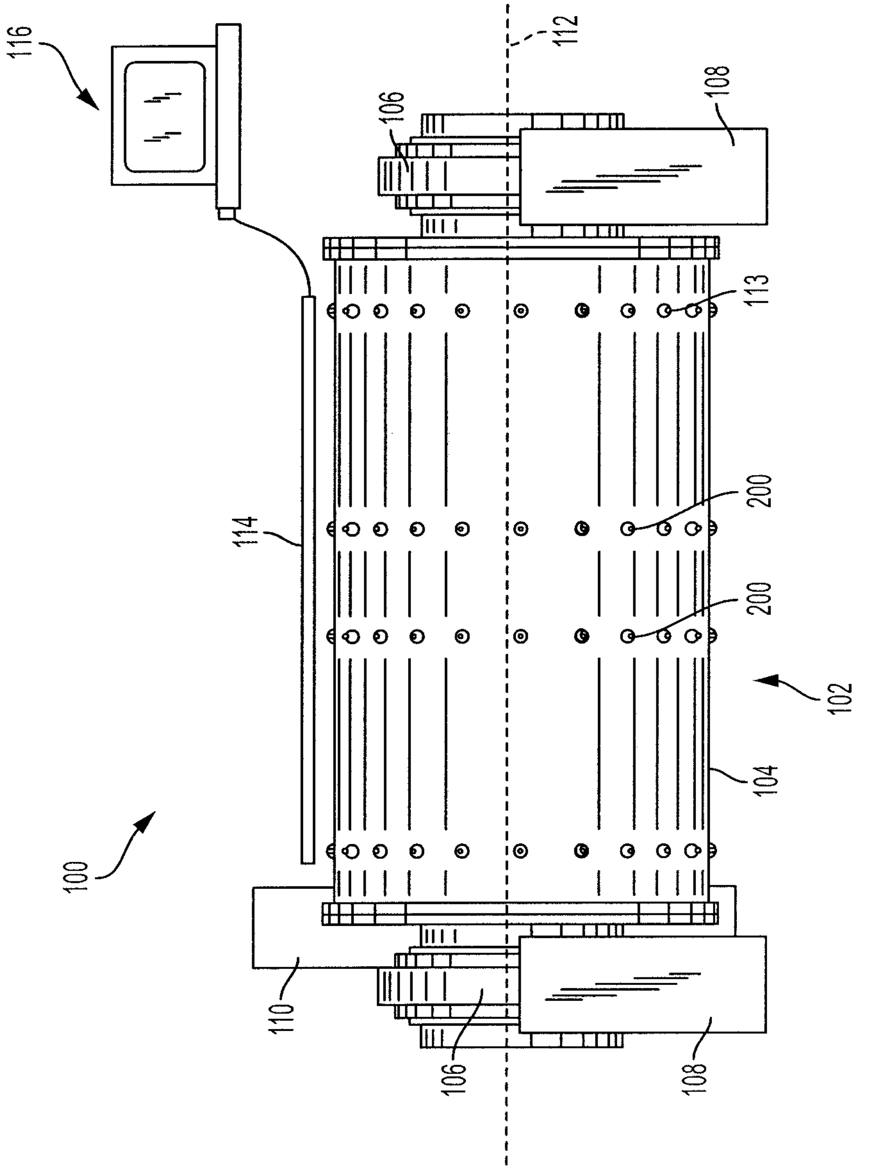
FIG. 1 is a longitudinal schematic view of an assembly, in accordance with an embodiment of the disclosure.

Wear indication devices are disclosed, as are assemblies including wear indication devices, and methods of detecting wear to a component of an assembly. In some embodiments, a wear indication device includes at least one sensor located within at least one opening at least partially extending through an outer body. The sensor may comprise a passive device or may comprise an active device, and may include at least one electronic device configured to transmit information regarding changes to the wear indication device to another device separate from the wear indication device. Each of the wear indication devices may be substantially the same, or at least one of the wear indication devices may be different than at least one other of the wear indication devices. During use and operation of the vessel, the wear indication devices and the wear-resistant structure may be subjected to wear. The sensors of the wear indication devices may indicate when the wear indication devices (and, hence the wear-resistant structure associated therewith) exhibit predetermined amounts of wear. Maintenance may then be performed on the vessel and/or the components thereof (e.g., the wear-resistant structure and one or more of the wear indication devices may be replaced), as desired, before damage to the vessel itself is incurred. Optionally, at least one of the wear indication devices may also be configured and operated to provide additional information associated with the operation of the vessel. The wear indication devices, assemblies, and methods of the disclosure may provide enhanced efficiency, reduced costs, and increased safety relative to conventional devices, assemblies, and methods associated with milling operations.

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular material, component, apparatus, assembly, system, or method, but are merely idealized representations that are employed to describe embodiments of the disclosure. The drawings presented herein are not necessarily drawn to scale. Additionally, elements common between drawings may retain the same numerical designation.

Although some embodiments of the disclosure are depicted as being used and employed in particular assemblies and components thereof, persons of ordinary skill in the art will understand that the embodiments of the disclosure may be employed in any assembly and/or component thereof where it is desirable to enhance wear detection (e.g., sensing, indication, etc.) relating to the assembly and/or component thereof during use and operation. By way of non-limiting example, embodiments of the disclosure may be employed in any equipment associated with processing a mined material (e.g., ore) and subject to degradation (e.g., physical degradation and/or chemical degradation) including, but not limited to, rotary mills, ball mills, rod mills, semiautogenous (SAG) mills, autogenous (AG) mills, crushers, impactors, grinders, hoppers, bins, chutes, and other components associated with processing (e.g., grinding, crushing, pulverizing, etc.) a mined material, as known in the art.

As used herein, the singular forms "a," "and" and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "configured" refers to a size, shape, material composition, and arrangement of one or more of at least one structure and at least one apparatus facilitating operation of one or more of the structure and the apparatus in a pre-determined way.

FIG. 1 is a longitudinal schematic view of an assembly 100 for use in accordance with an embodiment of the disclosure. The assembly 100 may be configured and operated to break down (e.g., grind, crush, pulverize, etc.) a mined material, such as ore. As shown in FIG. 1, the assembly 100 may include a vessel 102 (e.g., grinder, mill, etc.) formed of and including a shell 104. Bearings 106 and support structures 108 may be located at opposing lateral ends of the vessel 102, and at least one rotation device 110 (motor, drive, etc.) may be positioned and configured to rotate the vessel 102 about an axis 112 thereof. Wear indication devices 200 extend into an internal chamber of the vessel 102. The wear indication devices 200 are positioned and configured to attach (e.g., couple, bond, adhere, etc.) one or more components (e.g., wear-resistant structures) of the vessel 102 to at least one internal surface of the shell 104, and are also positioned and configured to obtain and communicate (e.g., relay, transmit, send, transfer, etc.) information related to the use and operation of the vessel 102, as described in further detail below. Optionally, at least one bolt 113 may also be positioned and configured to attach one or more components of the vessel 102 to the at least one internal surface of the shell 104. The at least one bolt 113 may be provided in addition to the wear indication devices 200, and/or may be provided in lieu of one or more of the wear indication devices 200, so long as at least one of the wear indication devices 200 is included in the assembly 100. In addition, at least one receiving device 114 may be positioned and configured to receive the information from the wear indication devices 200, and to communicate the information to one or more other devices 116 (e.g., computers) configured and operated to analyze, display, and/or act upon the information, as also described in further detail below.

Figure 2:
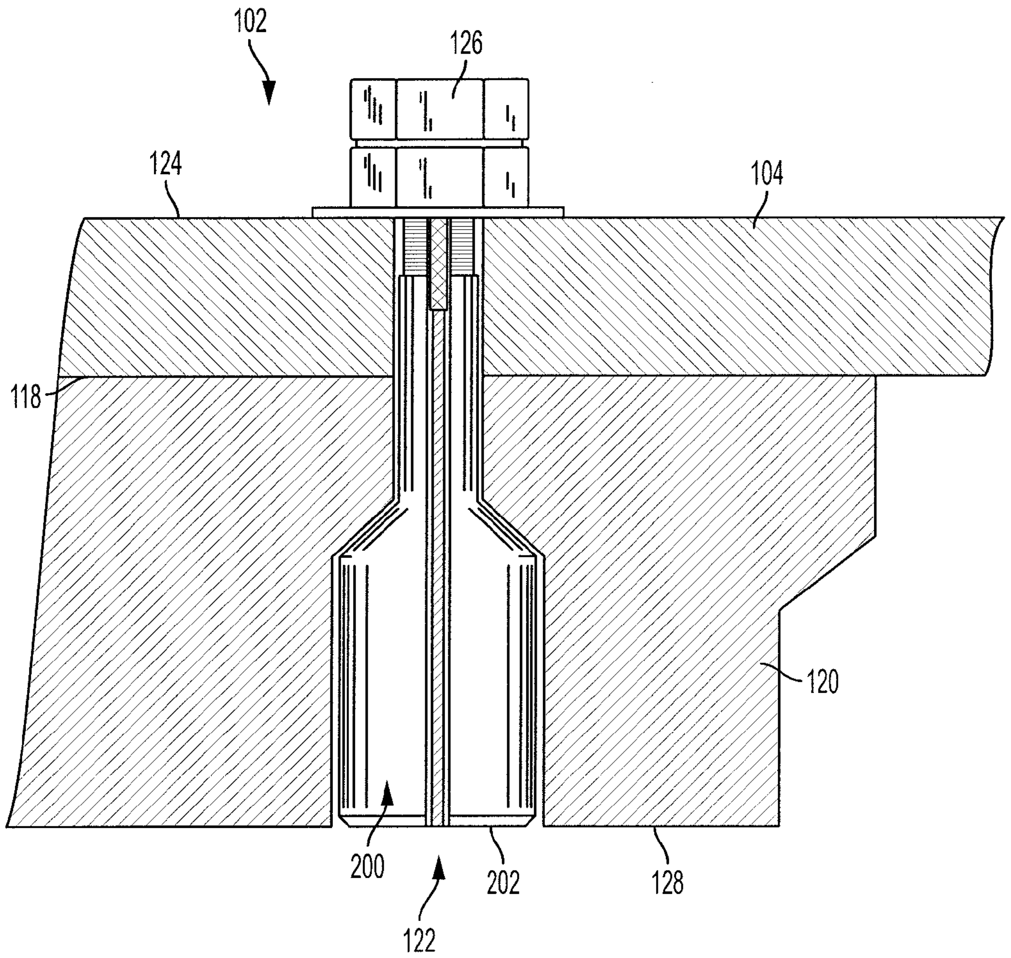
FIG. 2 is a partial, transverse cross-sectional view of a portion of the assembly depicted in FIG. 1, in accordance with an embodiment of the disclosure.

FIG. 2 is a partial, transverse cross-sectional view of the vessel 102 depicted in FIG. 1 at a location proximate one of the wear indication devices 200. As shown in FIG. 2, at least one internal surface 118 of the shell 104 of the vessel 102 is covered (e.g., lined) with at least one wear-resistant structure 120 (e.g., wear plate, wear liner, etc.). The wear-resistant structure 120 may be formed of and include at least one material that is resistant to physical degradation (e.g., abrasion, erosion, etc.) and/or chemical degradation (e.g., corrosion). The wear-resistant structure 120 may have any geometric configuration (e.g., shape and size) sufficient to substantially protect the shell 104 of the vessel 102 from degradation. In some embodiments, the internal surface 118 of the shell 104 is covered with a plurality of wear-resistant structures 120 positioned adjacent (e.g., laterally adjacent and/or longitudinally adjacent) to one another within an internal chamber 122 of the vessel 102, each of the plurality of wear-resistant structures 120 independently exhibiting a desired shape, size, and material composition.

Referring collectively to FIGS. 1 and 2, the wear indication devices 200 may at least partially attach (e.g., couple, affix, etc.) the wear-resistant structure 120 to the internal surface 118 of the shell 104. The wear indication devices 200 may be positioned in openings extending through each of the shell 104 and the wear-resistant structure 120. As depicted in FIG. 2, a portion (e.g., a threaded portion) of each of the wear indication devices 200 may protrude beyond an external surface 124 of the shell 104, and may be coupled to a retention device 126 (e.g., nut) overlying the external surface 124 of the shell 104. In addition, a first surface 202 of each of the wear indication devices 200 may be substantially co-planar with at least one internal surface 128 of the wear-resistant structure 120.

Figure 3:
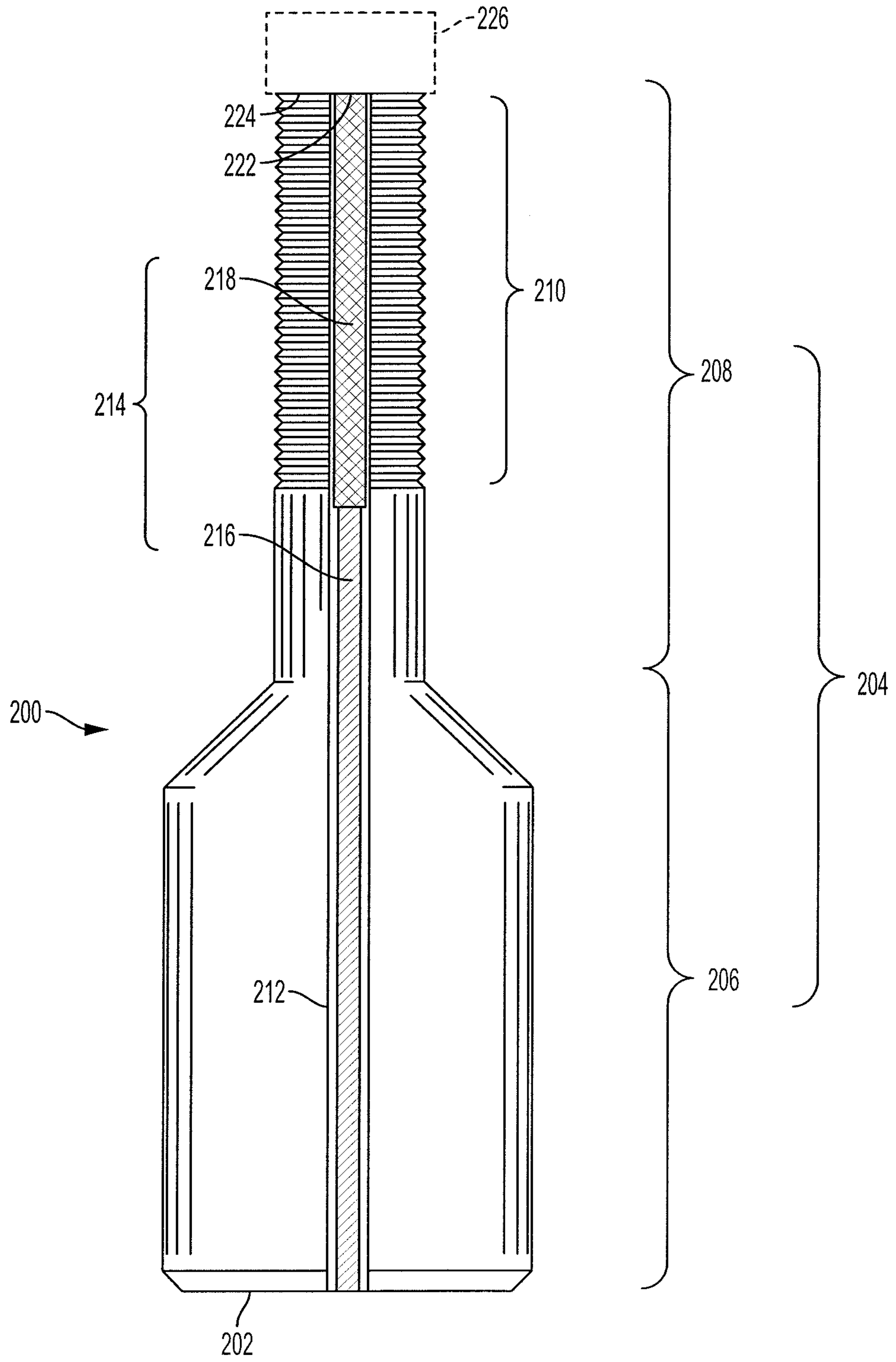
FIG. 3 is a transverse cross-sectional view of a wear indication device, in accordance with an embodiment of the disclosure.

FIG. 3 is a partial cross-sectional view of the wear indication device 200 depicted in FIG. 2. As shown in FIG. 3, the wear indication device 200 includes an outer body 204, and at least one sensor 214 at least partially (e.g., substantially) surrounded by the outer body 204. The outer body 204 may be formed of and include any material capable of retaining the wear-resistant structure 120 (FIG. 2) against the internal surface 118 (FIG. 2) of the shell 104 (FIG. 2) of the vessel 102 (FIG. 2) during use and operation of the vessel 102. In some embodiments, the outer body 204 is formed of and includes at least one of a metal and a metal alloy (e.g., steel). The outer body 204 may include a head region 206 and a stem region 208. The head region 206 may be integral and continuous with the stem region 208, and may extend outwardly beyond a lateral periphery of the stem region 208. At least a portion 210 of the stem region 208 may be threaded (e.g., for coupling with the retention device 126 shown in FIG. 2). In addition, at least one opening 212 (e.g., bore, via, recess, etc.) at least partially extends through the outer body 204. As depicted in FIG. 3, in some embodiments, the opening 212 comprises a through opening extending completely through each of the stem region 208 and the head region 206, as shown by broken lines in FIG. 3. In additional embodiments, the opening 212 comprises a blind opening, which may also be characterized as a bore, extending partially through the outer body 204 (e.g., partially through the stem region 208, completely through the stem region 208 and partially through the head region 206, etc.). The opening 212 may exhibit any desired lateral cross-sectional shape including, but not limited to, a circular shape, a tetragonal shape (e.g., square, rectangular, trapezium, trapezoidal, parallelogram, etc.), a triangular shape, a semicircular shape, an ovular shape, an elliptical shape, or a combination thereof. In addition, the opening 212 may exhibit substantially the same lateral dimensions (e.g., the same length and width, the same diameter, etc.) through-out the depth thereof, or the lateral dimensions of the opening 212 may vary through-out the depth thereof (e.g., an upper portion of the opening 212 may have at least one of a different length, a different width, and a different diameter than a lower portion of the opening 212). The sensor 214 is at least partially (e.g., substantially) positioned within the opening 212. A portion of the opening 212 not occupied by the sensor 214 may be at least partially (e.g., substantially) filled with another material, such as a self-hardening compound (e.g., an epoxy resin, such as a non-conductive epoxy resin).

The sensor 214 includes at least one probe 216 and at least one electronic device 218 connected to the at least one probe 216. The probe 216 may be configured and positioned to identify (e.g., signal, communicate, etc.) a change in at least one of the geometric configuration (e.g., size, shape, etc.) of the opening 212, and the environmental conditions (e.g., material composition, pressure, pH, temperature, etc.) present within the opening 212. The probe 216 may, for example, exhibit a size, shape, material composition, and position within the opening 212 facilitating detection of a reduction in the size (e.g., depth, height, etc.) of the opening 212. As a non-limiting example, the probe 216 may comprise at least one structure (e.g., a coil, a wire, a rod, a cylinder, etc.) formed of and including a variable resistance material and/or a variable capacitance material. Changes to the resistance and/or the capacitance of the structure resulting from wear to the structure may be detected by the electronic device 218 to indicate the wear level of the wear indication device 200 (and, hence, the wear-resistant structure 120 shown in FIG. 2). As another non-limiting example, the probe 216 may comprise at least one structure exhibiting multiple sections (e.g., portions) each independently including an electrical circuit loop (e.g., an open electrical circuit loop, or a closed electrical circuit loop). Modification (e.g., closing or opening) of the electrical circuit loop of one or more of the section(s) of the structure due to wear to the structure may be detected by the electronic device 218 to indicate the wear level of the wear indication device 200 (and, hence, the wear-resistant structure 120 shown in FIG. 2). The structure may exhibit any number of sections facilitating a desired amount of incremental wear detection.

The electronic device 218 may be formed of and include an integrated circuit (IC) configured and operated to respond to a change in the probe 216. The electronic device 218 is operatively associated with the probe 216, and includes at least one output device (e.g., wireless transmitter, audio transducer, light-emitting diode, etc.). The electronic device 218 may also include other structures and/or devices, such as one or more sensing modules (e.g., pressure sensing modules, temperature sensing modules, audio sensing modules, acceleration sensing modules, velocity sensing modules, radiation sensing modules, moisture sensing modules, pH sensing modules, etc.), power supplies (e.g., batteries), input devices (e.g., wireless receivers), memory devices, switches, resistors, capacitors, inductors, diodes, cases, etc. In some embodiments, at least a portion of the electronic device 218 comprises a wireless transmitter, such as a radio frequency identification device (RFID). The wireless transmitter may be configured and operated to receive information associated with one or more other component(s) (e.g., the probe 216, sensing modules of the electronic device 218, etc.) of the sensor 214 and to transmit the information to the receiving device 114 (FIG. 1) of the assembly 100 (FIG. 1) by way of a detectable wireless signal (e.g., a detectable radio frequency (RF) signal). The wireless transmitter may, for example, receive an interrogation signal (e.g., an RF signal) from the receiving device 114 and may output another signal (e.g., another RF signal) corresponding to the status of the probe 216. The wireless transmitter (e.g., RFID) may have a unique identification number permitting the wireless transmitter to be uniquely identified by the receiving device 114 relative to one or more wireless transmitters of other wear indication devices 200 (if any) of the assembly 100.

The sensor 214 may comprise a passive device configured to derive power for one or more components thereof from a device separate and distinct from the sensor 214, may comprise an active device including an integrated power supply (e.g., a power supply included as a component of the electronic device 218) configured to power one or more components of the sensor 214, or may comprise a combination thereof. In some embodiments, the sensor 214 is a passive device that utilizes an interrogation signal from the receiving device 114 (FIG. 1) of the assembly 100 (FIG. 1) as a power source. For example, as the sensor 214 comes into proximity of the receiving device 114 (e.g., during rotation of the vessel 102 shown in FIG. 1) an electromagnetic field emitted by the receiving device 114 may be used to temporarily stimulate (e.g., activate, excite, etc.) the electronic device 218 and the probe 216 of the sensor 214 and detect changes (e.g., resistivity changes, conductivity changes, etc.), if any, to the probe 216. The electronic device 218 may then relay the information back to the receiving device 114 for analysis (e.g., wear level analysis) prior to powering down (e.g., losing operational charge), and/or may store the information for future transmission to the receiving device 114 prior to powering down. In additional embodiments, the sensor 214 is an active device that utilizes an integrated power supply (e.g., at least one battery) as a power source. The sensor 214 may use the power supply to stimulate (e.g., substantially continuously stimulate, periodically stimulate, etc.) the electronic device 218 and the probe 216 and detect changes, if any, to the probe 216. The electronic device 218 may then relay (e.g., substantially continuously relay, periodically relay) the information back to the receiving device 114 for analysis (e.g., wear level analysis).

As shown in FIG. 3, in some embodiments, the sensor 214, including the probe 216 and the electronic device 218, is substantially confined within boundaries (e.g., lateral boundaries and/or longitudinal boundaries) of the opening 212 extending through the outer body 204 of the wear indication device 200. For example, an upper surface 222 of the electronic device 218 may be located within the opening 212, or may be substantially coplanar with an upper surface 224 of the stem region 208 of the outer body 204. Substantially confining the sensor 214 within the boundaries of the opening 212 may enhance safety and decrease the risk of equipment damage during use and operation of the vessel 102 (FIG. 1) (e.g., reducing the risk of components of the sensor 214, such as the electronic device 218, detaching and projecting during axial rotation of the vessel 102). In additional embodiments, one or more portion(s) of the sensor 214 project beyond the boundaries (e.g., lateral boundaries and/or longitudinal boundaries) of the opening 212. For example, as depicted in FIG. 3, optionally, a projecting portion 226 (as shown by dashed lines) of the sensor 214 may extend beyond at least one of lateral boundaries and longitudinal boundaries of the opening 212. If present, the projecting portion 226 of the sensor 214 may be attached (e.g., coupled) to one or more other components of the wear indication device 200 (e.g., one or more other components of the sensor 214, such as one or more other portions of the electronic device 218; one or more portions of the outer body 204, such as one or more portions of stem region 208; etc.) prior to attaching at least the outer body 204 of the wear indication device 200 (and, hence, the wear-resistant structure 120) to the shell 104 (FIG. 1) of the vessel 102, or may be attached to one or more other components of the wear indication device 200 after attaching at least the outer body 204 of the wear indication device 200 to the shell 104 of the vessel 102.

The sensor 214 may be configured and operated to sense and convey a single piece of information related to the use and operation of the vessel 102 (FIG. 1), or may be configured and operated to sense and convey multiple pieces of information related to the use and operation of the vessel 102. For example, the sensor 214 may be configured and operated to sense and convey the amount of wear exhibited by the outer body 204 of the wear indication device 200 (and, hence, the amount of wear exhibited by the wear-resistant structure 120 (FIG. 2) adjacent to and held by the outer body 204 of the wear indication device 200) alone, or the sensor 214 may be configured and operated to sense and convey the amount of wear exhibited by the outer body 204 of the wear indication device 200 as well as information pertaining to one or more of the velocity of the vessel 102 (FIG. 1), the movement of materials (e.g., ore, charge, etc.) within the internal chamber 122 (FIG. 2) of the vessel 102, and the composition of the materials within the internal chamber 122 of the vessel 102. If the sensor 214 is configured and operated to sense and convey multiple pieces of information related to the use and operation of the vessel 102, the electronic device 218 of the sensor 214 may utilize a single output device to convey the different pieces of information (e.g., a single wireless transmitter transmitting different data, a single audio transducer producing different sounds and/or different audio frequencies, a single LED producing different light intensities, etc.), or may utilize multiple output devices to convey the different pieces of information (e.g., multiple wireless transmitters transmitting different data, multiple audio transducers producing different sounds and/or different audio frequencies, multiple LEDs producing different colors of light and/or different light intensities, etc.).

Figure 4:
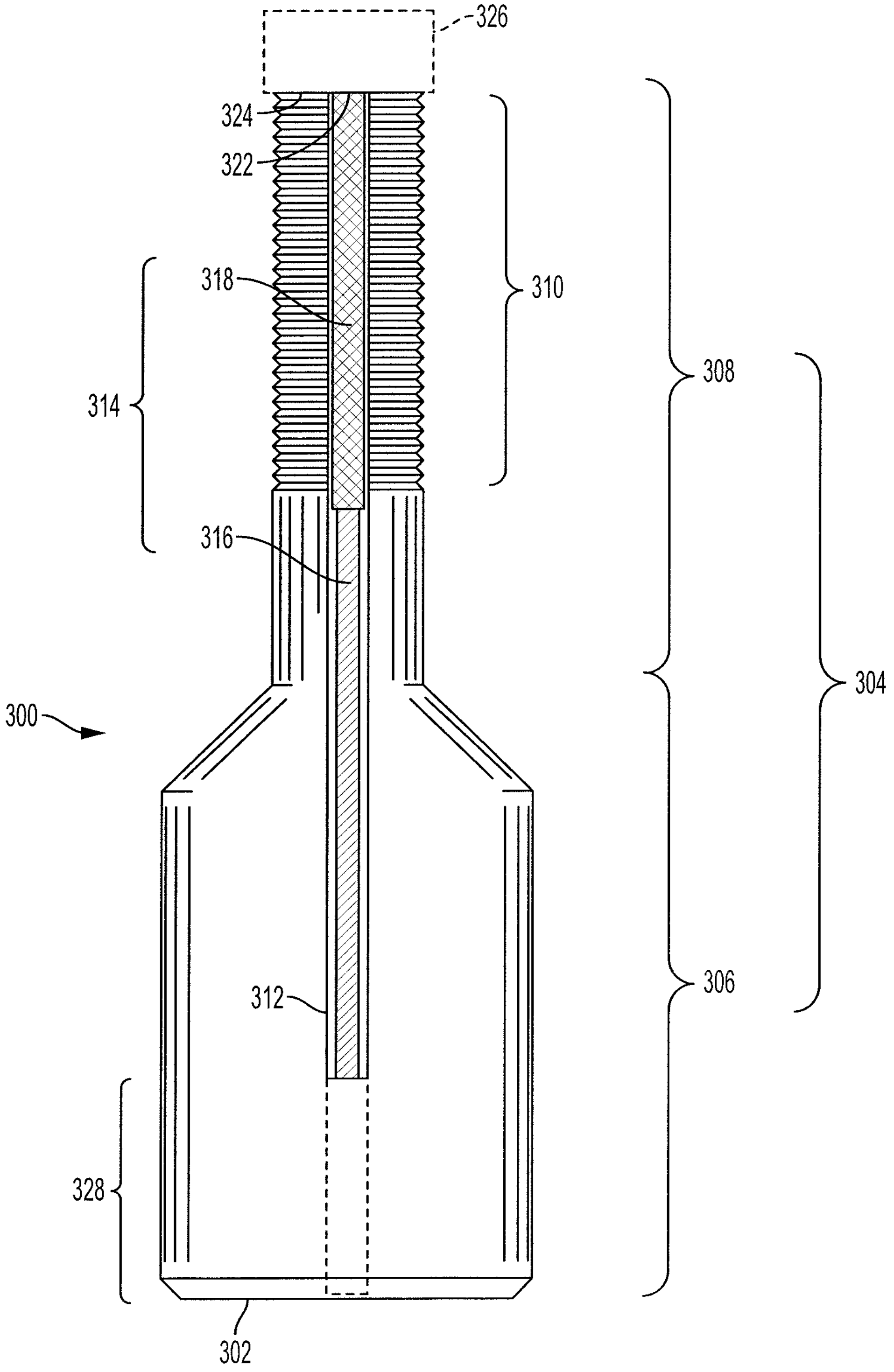
FIG. 4 is a transverse cross-sectional view of a wear indication device, in accordance with another embodiment of the disclosure.

FIG. 4 illustrates a partial cross-sectional view of a wear indication device 300, in accordance with additional embodiments of the disclosure. To avoid repetition, not all features shown in FIG. 4 are described in detail herein. Rather, unless described otherwise below, features designated by a reference numeral that is a 100 increment of the reference numeral of a feature described previously in relation to FIG. 3 will be understood to be substantially similar to the feature described previously.

As shown in FIG. 4, the wear indication device 300 may include at least one sensor 314 disposed within at least one opening 312 at least partially extending through an outer body 304. The sensor 314 may be formed of and include at least one probe 316 and at least one electronic device 318. As depicted in FIG. 4, in some embodiments, the opening 312 comprises a blind opening, which may also be characterized as a bore, extending completely through a stem region 308 of the outer body 304 and partially into a head region 306 of the outer body 304. In additional embodiments, the opening 312 comprises a through opening extending completely through each of the stem region 308 and the head region 306, as shown by broken lines in FIG. 4. The opening 312 may exhibit any desired shape (e.g., lateral cross-sectional shape) and any desired dimensions (e.g., length, width, etc.), such as one or more of the shapes and dimensions previously described in relation to the opening 212 shown in FIG. 3. The sensor 314 is at least partially (e.g., substantially) positioned within the opening 312. A portion of the opening 312 not occupied by the sensor 314 may be at least partially (e.g., substantially) filled with another material, such as a self-hardening compound (e.g., an epoxy resin, such as a non-conductive epoxy resin).

The probe 316 may be configured and positioned to identify (e.g., signal, communicate, etc.) a change in at least one of the geometric configuration of the opening 312, and the environmental conditions present within the opening 312. The probe 316 may exhibit a size, shape, material composition, and position within the opening 312 facilitating detection of at least one of a reduction in the depth of the opening 312, a modification of the shape of the opening 312, and a change in the material composition (e.g., water content) within the opening 312. In some embodiments, the probe 316 comprises one or more of the probes described in U.S. patent application Ser. No. 14/304,649, now U.S. Pat. No. 9,473,389, issued Oct. 25, 2016, filed Jun. 13, 2014, the disclosure of which is hereby incorporated herein in its entirety by this reference. As a non-limiting example, the probe 316 may comprise an at least partially conductive structure (e.g., a conductive wire, a conductive rod, a conductive cylinder, etc.) that forms an open electrical circuit with other components of the wear indication device 300 (e.g., the electronic device 318, and the outer body 304, etc.) under the initial geometric configuration of the opening 312, and that may form a closed electrical circuit with other components of the wear indication device 300 upon modification of the opening 312 during use and operation of the vessel 102 (FIG. 1). The conductive material of the probe 316 may, for example, initially be electrically isolated (e.g., by way of a spatial offset and/or electrically insulating material) from a conductive material (e.g., metal, metal alloy, etc.) of the outer body 304 of the wear indication device 300, but may become electrically coupled to the conductive material of the outer body 304 after the outer body 304 sustains a predetermined amount of wear (e.g., after at least a capping portion 328 of the head region 306 is removed) to form a closed electrical circuit. As another non-limiting example, the probe 316 may comprise a wick configured and positioned to transport conductive liquid (e.g., water) to the electronic device 318. The electronic device 318 may form an open electrical circuit under the initial geometric configuration of the opening 312, and may form a closed electrical circuit after a conductive liquid is provided (e.g., wicked, transported, etc.) thereto by the probe 316 upon modification of the opening 312 during use and operation of the vessel 102. As an additional non-limiting example, the probe 316 may comprise a sealed, at least partially hollow structure formed of and including one or more of a flexible material (e.g., metal foil, plastic, rubber, etc.) and a brittle material (e.g., a ceramic material, silicon, glass, sapphire, quartz, etc.). The sealed, at least partially hollow structure of the probe 316 may deform (e.g., warp, bend, etc.), rupture (e.g., break), and/or degrade (e.g., wear away) upon modification of the opening 312 during use and operation of the vessel 102 to modify the internal pressure of the probe 316.

The electronic device 318 of the wear indication device 300 is operatively associated with the probe 316, and may be substantially similar to the electronic device 218 previously described with respect to FIG. 3. For example, the electronic device 318 may include at least one output device (e.g., wireless transmitter, audio transducer, light-emitting diode, etc.), and, optionally, one or more other structures and/or devices (e.g., one or more sensing modules, such as pressure sensing modules, temperature sensing modules, audio sensing modules, acceleration sensing modules, velocity sensing modules, radiation sensing modules, moisture sensing modules, pH sensing modules, etc.; power supplies, such as batteries; input devices, such as wireless receivers; memory devices; switches; resistors; capacitors; inductors; diodes; cases; etc.). In some embodiments, at least a portion of the electronic device 318 comprises a wireless transmitter, such as an RFID.

The sensor 314 may comprise a passive device configured to derive power for one or more components thereof from a device separate and distinct from the sensor 314, may comprise an active device including an integrated power supply (e.g., a power supply included as a component of the electronic device 318) configured to power one or more components of the sensor 314, or may comprise a combination thereof. In some embodiments, the sensor 314 is a passive device that utilizes an interrogation signal from the receiving device 114 (FIG. 1) of the assembly 100 (FIG. 1) as a power source to temporarily stimulate one or more components of the sensor 314 and detect and/or transmit information on changes (e.g., current flow changes, pressure changes, etc.), if any, to the sensor 314 (e.g., in a manner substantially similar to that previously described in relation to the sensor 214 shown in FIG. 3). In additional embodiments, the sensor 314 is an active device that utilizes an integrated power supply (e.g., at least one battery) as a power source to stimulate (e.g., substantially continuously stimulate, periodically stimulate, etc.) one or more components of the sensor 314 and detect and/or transmit information on changes to the sensor 314.

The sensor 314 may be configured and operated to sense and convey a single piece of information (e.g., the amount of wear exhibited by the outer body 304) related to the use and operation of the vessel 102 (FIG. 1), or may be configured and operated to sense and convey multiple pieces of information (e.g., the amount of wear exhibited by the outer body 304, the velocity of the vessel 102, the movement of materials within the vessel 102, the composition of the materials within the vessel 102, etc.). In addition, the sensor 314 may be substantially confined within boundaries (e.g., lateral boundaries and/or longitudinal boundaries) of the opening 312, or may project beyond the boundaries of the opening 312. In some embodiments, the sensor 314 is substantially confined within the boundaries of the opening 312. In additional embodiments, a projecting portion 326 of the sensor 314 extends beyond the boundaries of the opening 312. If present, the projecting portion 326 of the sensor 314 may be attached (e.g., coupled) to one or more other components of the wear indication device 300 (e.g., one or more other components of the sensor 314, such as one or more other portions of the electronic device 318; one or more portions of the outer body 304, such as one or more portions of the stem region 308; etc.) prior to attaching at least the outer body 304 of the wear indication device 300 (and, hence, the wear-resistant structure 120) to the shell 104 (FIG. 1) of the vessel 102, or may be attached to one or more other components of the wear indication device 300 after attaching at least the outer body 304 of the wear indication device 300 to the shell 104 of the vessel 102.

Figure 5:
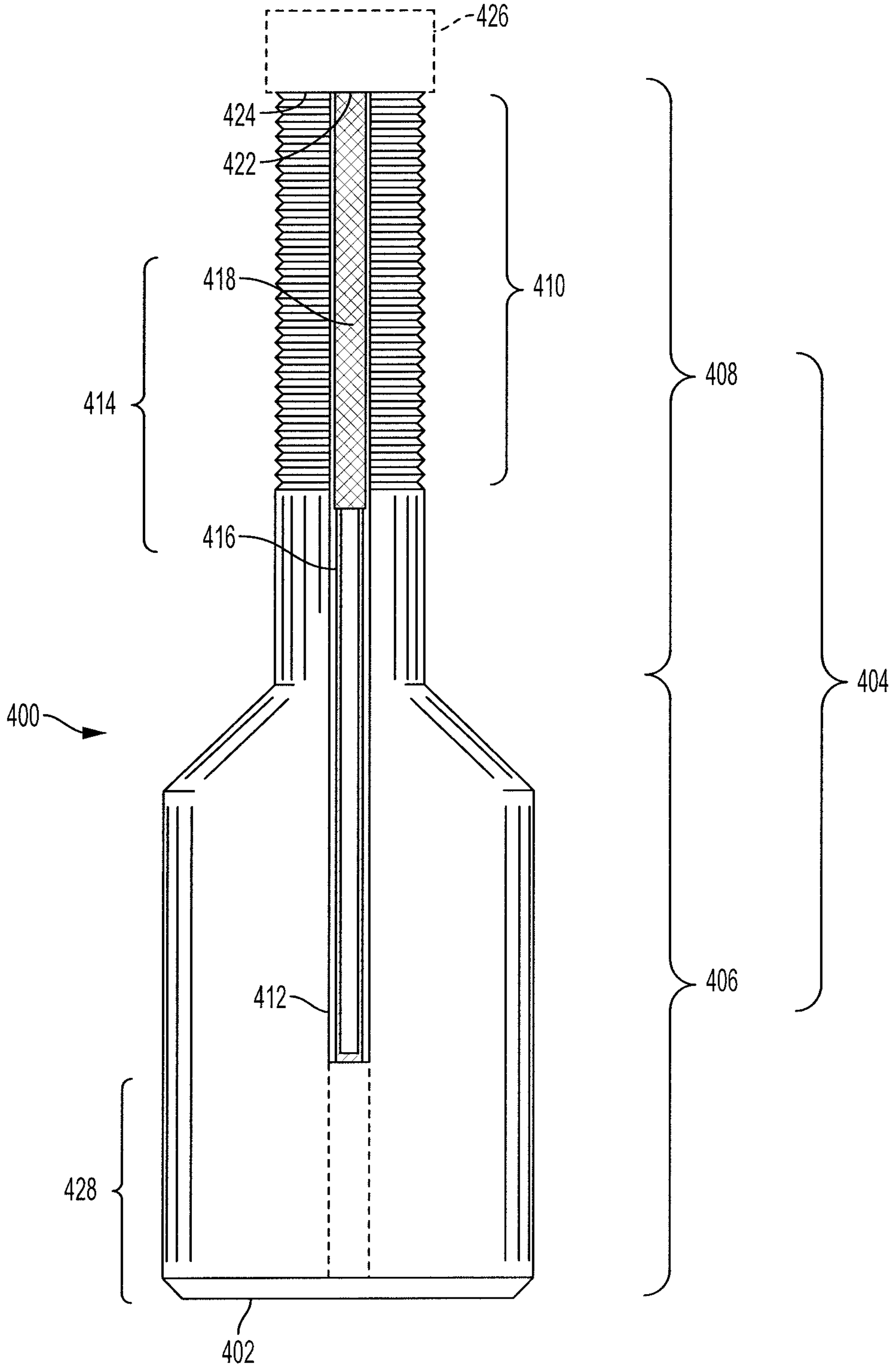
FIG. 5 is a transverse cross-sectional view of a wear indication device, in accordance with an additional embodiment of the disclosure.

FIG. 5 illustrates a partial, transverse cross-sectional view of a wear indication device 400, in accordance with further embodiments of the disclosure. To avoid repetition, not all features shown in FIG. 5 are described in detail herein. Rather, unless described otherwise below, features designated by a reference numeral that is a 100 increment of the reference numeral of a feature described previously in relation to FIG. 3 will be understood to be substantially similar to the feature described previously.

As shown in FIG. 5, the wear indication device 400 may include a sensor 414 disposed within an opening 412 at least partially extending through an outer body 404. The sensor 414 may be formed of and include at least one probe 416 and at least one electronic device 418. As depicted in FIG. 5, in some embodiments, the opening 412 comprises a blind opening extending completely through a stem region 408 of the outer body 404 and partially into a head region 406 of the outer body 404. In additional embodiments, the opening 412 comprises a through opening extending completely through each of the stem region 408 and the head region 406, as shown by broken lines in FIG. 5. The opening 412 may exhibit any desired shape (e.g., lateral cross-sectional shape) and any desired dimensions (e.g., length, width, etc.), such as one or more of the shapes and dimensions previously described in relation to the opening 212 shown in FIG. 3. The sensor 414 is at least partially (e.g., substantially) positioned within the opening 412. A portion of the opening 412 not occupied by the sensor 414 may be at least partially (e.g., substantially) filled with another material, such as a self-hardening compound (e.g., an epoxy resin, such as a non-conductive epoxy resin).

The probe 416 may be configured and positioned to identify (e.g., signal, communicate, etc.) a change in at least one of the geometric configuration of the opening 412, and the environmental conditions present within the opening 412. The probe 416 may exhibit a size, shape, material composition, and position within the opening 412 at least facilitating detection of a reduction in the size (e.g., depth, height, etc.) of the opening 412. The probe 416 may, for example, comprise an at least partially conductive structure (e.g., a conductive wire) that forms a closed electrical circuit with other components of the wear indication device 400 (e.g., the electronic device 418, and the outer body 404, etc.) under the initial geometric configuration of the opening 412, and that may form an open (e.g., broken) electrical circuit with other components of the wear indication device 400 upon modification of the opening 412 during use and operation of the vessel 102 (FIG. 1). By way of non-limiting example, the probe 416 may comprise a conductive wire loop exhibiting terminal ends connected to the electronic device 418 and a central portion extending to a predetermined depth within the opening 412. After at least a capping portion 428 of the head region 406 of the outer body 404 is removed (e.g., worn away, abraded away, etc.), the central portion of the conductive wire loop may become exposed and subsequently worn away to break a closed electrical circuit of the sensor 414. The change from a closed electrical circuit to an open electrical circuit may be used to identity that at least a predetermined amount of wear (e.g., corresponding to the depth of the central portion of the conductive wire loop) has occurred to the wear indication device 400, as described in further detail below. In some embodiments, an electrically insulating material (e.g., an insulating sheath, an isolating filler material, etc.) is disposed between a conductive material of the probe 416 and surfaces of the outer body 404 defining the opening 412.

The electronic device 418 of the wear indication device 400 is operatively associated with the probe 416, and may be substantially similar to the electronic device 218 previously described with respect to FIG. 3. For example, the electronic device 418 may include at least one output device (e.g., wireless transmitter, audio transducer, light-emitting diode, etc.), and, optionally, one or more other structures and/or devices (e.g., one or more sensing modules, such as pressure sensing modules, temperature sensing modules, audio sensing modules, acceleration sensing modules, velocity sensing modules, radiation sensing modules, moisture sensing modules, pH sensing modules, etc.; power supplies, such as batteries; input devices, such as wireless receivers; memory devices; switches; resistors; capacitors; inductors; diodes; cases; etc.). In some embodiments, at least a portion of the electronic device 418 comprises a wireless transmitter, such as an RFID.

The sensor 414 may comprise a passive device configured to derive power for one or more components thereof from a device separate and distinct from the sensor 414, may comprise an active device including an integrated power supply (e.g., a power supply included as a component of the electronic device 418) configured to power one or more components of the sensor 414, or may comprise a combination thereof. In some embodiments, the sensor 414 is a passive device that utilizes an interrogation signal from the receiving device 114 (FIG. 1) of the assembly 100 (FIG. 1) as a power source to temporarily stimulate one or more components of the sensor 414 and detect and/or transmit information on changes (e.g., current flow changes), if any, to the sensor 414 (e.g., in a manner substantially similar to that previously described in relation to the sensor 214 shown in FIG. 3). In additional embodiments, the sensor 414 is an active device that utilizes an integrated power supply (e.g., at least one battery) as a power source to stimulate (e.g., substantially continuously stimulate, periodically stimulate, etc.) one or more components of the sensor 414 and detect and/or transmit information on changes to the sensor 414.

The sensor 414 may be configured and operated to sense and convey a single piece of information (e.g., the amount of wear exhibited by the outer body 404) related to the use and operation of the vessel 102 (FIG. 1), or may be configured and operated to sense and convey multiple pieces of information (e.g., the amount of wear exhibited by the outer body 404, velocity of the vessel 102, the movement of materials within the vessel 102, the composition of the materials within the vessel 102, etc.). In addition, the sensor 414 may be substantially confined within boundaries (e.g., lateral boundaries and/or longitudinal boundaries) of the opening 412, or may project beyond the boundaries of the opening 412. In some embodiments, the sensor 414 is substantially confined within the boundaries of the opening 412. In additional embodiments, a projecting portion 426 (as shown by dashed lines) of the sensor 414 extends beyond the boundaries of the opening 412. If present, the projecting portion 426 of the sensor 414 may be attached (e.g., coupled) to one or more other components of the wear indication device 400 (e.g., one or more other components of the sensor 414, such as one or more other portions of the electronic device 418; one or more portions of the outer body 404, such as one or more portions of the stem region 408; etc.) prior to attaching at least the outer body 404 of the wear indication device 400 (and, hence, the wear-resistant structure 120) to the shell 104 (FIG. 1) of the vessel 102, or may be attached to one or more other components of the wear indication device 400 after attaching at least the outer body 404 of the wear indication device 400 to the shell 104 of the vessel 102.

Figure 6:
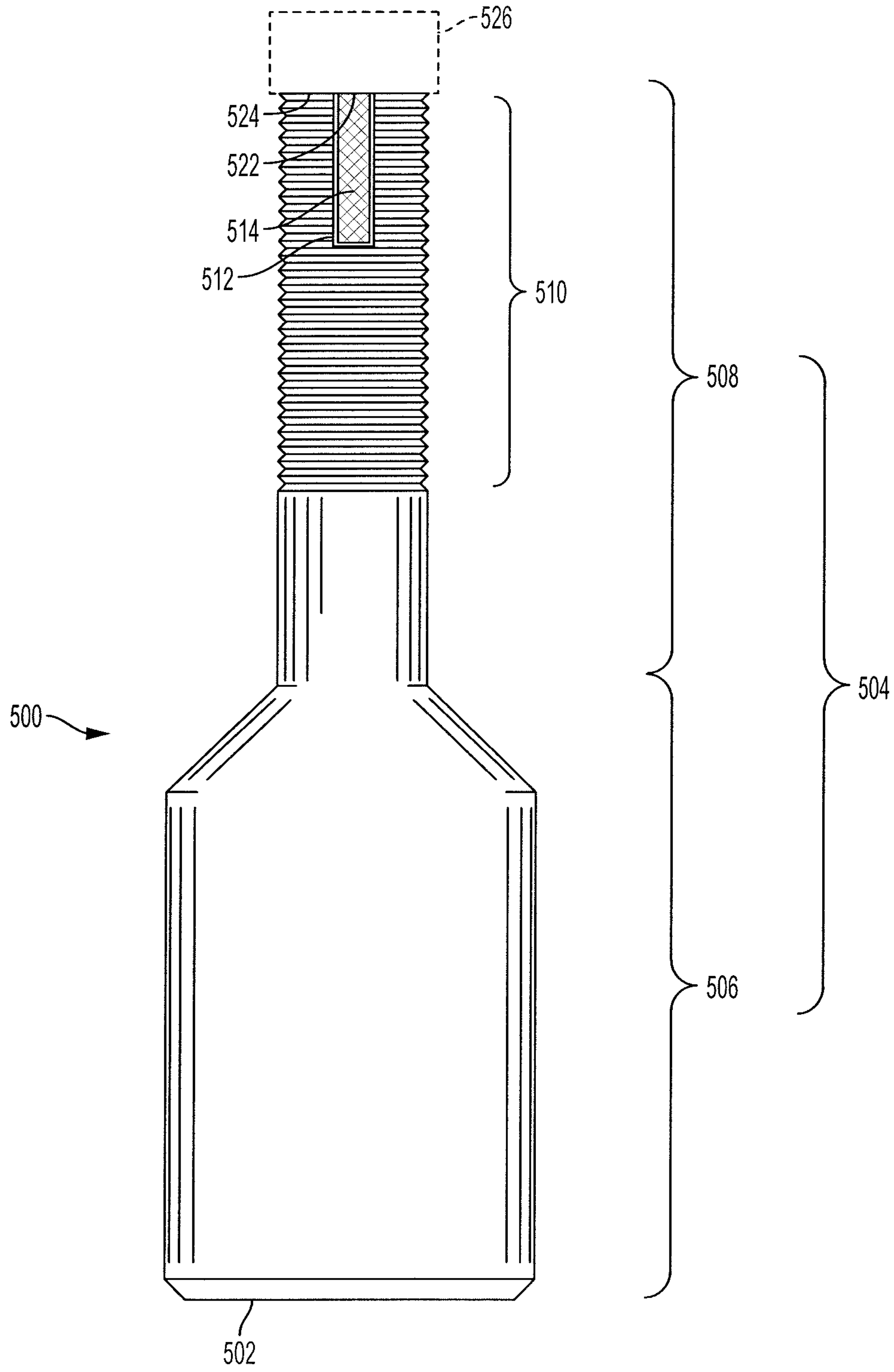
FIG. 6 is a transverse cross-sectional view of a wear indication device, in accordance with a further embodiment of the disclosure.

FIG. 6 illustrates a partial, transverse cross-sectional view of a wear indication device 500, in accordance with further embodiments of the disclosure. To avoid repetition, not all features shown in FIG. 6 are described in detail herein. Rather, unless described otherwise below, features designated by a reference numeral that is a 100 increment of the reference numeral of a feature described previously in relation to FIG. 3 will be understood to be substantially similar to the feature described previously.

As shown in FIG. 6, the wear indication device 500 may include a sensor 514 disposed within an opening 512 at least partially extending through an outer body 504. As depicted in FIG. 6, in some embodiments, the opening 512 comprises a blind opening extending partially through a stem region 508 of the outer body 504. The opening 512 may be substantially limited to the stem region 508 of the outer body 504, such as substantially limited to an upper region of the stem region 508 proximate an upper surface 524 of the stem region 508. In additional embodiments, the opening 512 may comprise a blind opening extending completely through the stem region 508 and partially into a head region 506 of the outer body 504. In further embodiments, the opening 512 may comprise a through opening extending completely through each of the stem region 508 and the head region 506. The opening 512 may exhibit any desired shape (e.g., lateral cross-sectional shape) and any desired dimensions (e.g., length, width, etc.) facilitating the reception of the sensor 514, such as one or more of the shapes and dimensions previously described in relation to the opening 212 shown in FIG. 3. The sensor 514 is at least partially (e.g., substantially) positioned within the opening 512. A portion of the opening 512 not occupied by the sensor 514 may be at least partially (e.g., substantially) filled with another material, such as a self-hardening compound (e.g., an epoxy resin, such as a non-conductive epoxy resin).

The sensor 514 may comprise an electronic device configured and positioned to detect a change in at least one of the geometric configuration of the opening 512 and the environmental conditions present within the opening 512, and to communicate (e.g., transmit, relay, convey, etc.) information related to the geometric configuration and/or the internal environmental conditions of the opening 512 to at least one other device (e.g., the receiving device 114 of the assembly 100 shown in FIG. 1). The sensor 514 may include at least one monitoring device (e.g., an ultrasonic monitoring device), and at least one output device (e.g., wireless transmitter, audio transducer, light-emitting diode, etc.). The sensor 514 may also include other structures and/or devices, such as one or more sensing modules (e.g., pressure sensing modules, temperature sensing modules, audio sensing modules, acceleration sensing modules, velocity sensing modules, radiation sensing modules, moisture sensing modules, pH sensing modules, etc.), power supplies (e.g., batteries), input devices (e.g., wireless receivers), memory devices, switches, resistors, capacitors, inductors, diodes, cases, etc.

The monitoring device of the sensor 514 may comprise a device configured and positioned to at least detect wear to the wear indication device 500. The monitoring device may be configured and positioned to monitor the thickness and/or the volume of at least a portion of the outer body 504 of the wear indication device 500 without the use of a probe. The monitoring device may, for example, employ at least one of sound (e.g., ultrasound) and radiation to determine the thickness and/or the volume of at least the head region 506 (e.g., the head region 506 and at least a portion of the stem region 508) of the outer body 504 without the use of a structure physically extending into the head region 506 of the outer body 504. By way of non-limiting example, the monitoring device may comprise an ultrasonic monitoring device configured and positioned to direct an ultrasound signal (e.g., ultrasound waves) into at least a portion of the outer body 504 to determine the thickness and/or the volume of the at least a portion of the outer body 504. In some embodiments, the ultrasonic monitoring device utilizes pulse-echo monitoring to measure a thickness of the outer body 504. For example, the ultrasonic monitoring device may generate an ultrasound pulse (e.g., through application of a short voltage pulse across a piezoelectric material of the ultrasonic monitoring device), direct the ultrasound pulse into the outer body 504, and then determine a time distance of arrival (TDOA) (e.g., the amount of time until an echoed ultrasound pulse is detected by the ultrasonic monitoring device). The TDOA may then be multiplied by the ultrasound velocity in the material of the outer body 504 to determine the distance travelled by the ultrasound pulse, which may be used to determine a thickness of the outer body 504. The ultrasound pulse may continue to echo back and forth within the outer body 504, and the TDOA between the echoes may be measured and averaged to determine an averaged value for the thickness of the outer body 504.

The output device of the sensor 514 may comprise a device or module operatively associated with the monitoring device, and configured to communicate with (e.g., at least convey information to) the receiving device 114 (FIG. 1) of the assembly 100 (FIG. 1). For example, the output device may comprise one or more of a wireless transmitter, an audio transducer, and a light-emitting diode configured to relay one or more pieces of information (e.g., the amount of wear exhibited by the outer body 504, the velocity of the vessel 102, the movement of materials within the vessel 102, the composition of the materials within the vessel 102, etc.) to the receiving device 114. In some embodiments, the output device comprises a wireless transmitter (e.g., an RFID) configured and operated to receive information associated with one or more other component(s) (e.g., the monitoring device, other sensing modules, etc.) of the sensor 514 and to transmit to the receiving device 114 by way of a detectable wireless signal (e.g., by way of a detectable RF signal). The wireless transmitter may, for example, receive an interrogation signal (e.g., an RF signal) from the receiving device 114 of the assembly 100 and may output another signal (e.g., another RF signal) corresponding to the status (e.g., wear level) of the outer body 504 of the wear indication device 500. The wireless transmitter may have a unique identification number permitting it to be uniquely identified by the receiving device 114 relative to one or more wireless transmitters of other wear indication devices 500 (if any) of the assembly 100.

The sensor 514 may comprise an active device including an integrated power supply (e.g., a power supply included as a component of the sensor 514) configured to power one or more components of the sensor 514, may comprise a passive device configured to derive power for one or more components thereof from a device (e.g., the receiving device 114 shown in FIG. 1) separate and distinct from the sensor 514, or may comprise a combination thereof. In some embodiments, the sensor 514 is an active device that utilizes an integrated power supply (e.g., at least one battery) as a power source to stimulate (e.g., substantially continuously stimulate, periodically stimulate, etc.) one or more components of the sensor 514 and detect and/or transmit information on changes to the sensor 514. In additional embodiments, the sensor 514 is a passive device that utilizes an interrogation signal from the receiving device 114 (FIG. 1) of the assembly 100 (FIG. 1) as a power source to temporarily stimulate one or more components of the sensor 514 and detect and/or transmit information on changes (e.g., thickness changes, volume change, etc.), if any, to the outer body 504 of the wear indication device 500.

The sensor 514 may be configured and operated to sense and convey a single piece of information (e.g., the amount of wear exhibited by the outer body 504) related to the use and operation of the vessel 102 (FIG. 1), or may be configured and operated to sense and convey multiple pieces of information (e.g., the amount of wear exhibited by the outer body 504, the velocity of the vessel 102, the movement of materials within the vessel 102, the composition of the materials within the vessel 102, etc.). In addition, the sensor 514 may be substantially confined within boundaries (e.g., lateral boundaries and/or longitudinal boundaries) of the opening 512, or may project beyond the boundaries of the opening 512. In some embodiments, the sensor 514 is substantially confined within the boundaries of the opening 512. In additional embodiments, a projecting portion 526 of the sensor 514 extends beyond the boundaries of the opening 512. If present, the projecting portion 526 of the sensor 514 may be attached (e.g., coupled) to one or more other components of the wear indication device 500 (e.g., one or more other components of the sensor 514; one or more portions of the outer body 504, such as one or more portions of the stem region 508; etc.) prior to attaching at least the outer body 504 of the wear indication device 500 (and, hence, the wear-resistant structure 120) to the shell 104 (FIG. 1) of the vessel 102, or may be attached to one or more other components of the wear indication device 500 after attaching at least the outer body 504 of the wear indication device 500 to the shell 104 of the vessel 102.

Referring again to FIG. 1, the receiving device 114 may be any device positioned and configured to detect (e.g., sense) and receive the output (e.g., wireless transmission, sound, light, etc.) from the wear indication devices 200 (and/or the wear indication devices 300, 400, 500 described in relation to FIGS. 4 through 6, any of which may be substituted for any or all of the wear indication devices 200 described in relation to FIGS. 1 and 2). The receiving device 114 may be selected and positioned at least partially based on the configuration of the wear indication devices 200 (and/or the wear indication devices 300, 400). For example, if the output device of the electronic device 218 (FIG. 3) of the sensor 214 (FIG. 3) of one or more of the wear indication devices 200 comprises at least one wireless transmitter, the receiving device 114 may comprise a wireless receiver positioned and configured to detect and receive wireless communications from the wireless transmitter. As another example, if the output device of the electronic device 218 of the sensor 214 of one of more of the wear indication devices 200 comprises at least one audio transducer, the receiving device 114 may comprise an audio sensor positioned and configured to detect sound at one or more frequencies emitted by the audio transducer, which one or more frequencies may be selected to avoid ambient noise experienced during processing operations. As an additional example, if the output device of the electronic device 218 of the sensor 214 of one or more of the wear indication devices 200 comprises at least one LED, the receiving device 114 may comprise a light sensor positioned and configured to detect radiation (e.g., light) emitted by the LED. The receiving device 114 may have any geometric configuration (e.g., size, shape, etc.) permitting the receiving device 114 to detect output from the wear indication devices 200 individually and/or collectively. The receiving device 114 may communicate with one or more of the other devices 116 (e.g., computers), where the information conveyed by the wear indication devices 200 may be analyzed and acted upon. Optionally, the receiving device 114 may also be configured and operated to output information to one or more of the wear indication devices 200. For example, if the electronic device 218 (FIG. 3) of at least one of the wear indication devices 200 includes a receiving device, the receiving device 114 may be configured and operated to relay information from one or more of the other devices 116 to the at least one wear indication device 200 (e.g., to activate at least one specific sensor and/or at least one specific sensing module present in the at least one wear indication device 200).

With continued reference to FIG. 1, the vessel 102 may exhibit any desired distribution of the wear indication devices 200 (and/or the wear indication devices 300, 400, 500 described in relation to FIGS. 4 through 6). Each of the wear indication devices 200 (or the wear indication devices 300, 400, 500) may be substantially the same and may be uniformly (e.g., regularly, evenly, etc.) spaced relative to the other wear indication devices 200 (or the other wear indication devices 300, 400, 500), or at least one of the wear indication devices 200 (and/or at least one of the wear indication devices 300, 400, 500) may be different than at least one other of the wear indication devices 200 (and/or at least one other of the wear indication devices 300, 400, 500) and/or may be non-uniformly (e.g., non-regularly, non-evenly, etc.) spaced relative to the other wear indication devices 200 (and/or the other wear indication devices 300, 400, 500). As a non-limiting example, the sensor 214 (FIG. 3) (and/or the sensors 314, 414, 514 described in relation to FIGS. 4 through 6) of at least one of the wear indication devices 200 (and/or the wear indication devices 300, 400, 500) may be different (e.g., exhibit different components, exhibit a different size, exhibit a different shape, exhibit a different material composition, etc.) than the sensor 214 (and/or the sensors 314, 414, 514) of at least one other of the wear indication devices 200 (and/or the wear indication devices 300, 400, 500). In some embodiments, the wear indication devices 200 (and/or the wear indication devices 300, 400, 500) are selected and spaced at least partially based on analysis of historical wear patterns and/or other information for the vessel 102.

Therefore, with reference to FIGS. 1 through 3, and in accordance with embodiments of the disclosure, a method for detecting wear to at least one wear-resistant structure 120 within a vessel 102 (e.g., mill) of an assembly 100 (e.g., milling assembly, grinding assembly, etc.) during use and operation of the assembly 100 may include forming the wear indication devices 200 (and/or the wear indication devices 300, 400, 500 previously described in relation to FIGS. 4 through 6). The wear-resistant structure 120 may be positioned and attached to a shell 104 of the vessel 102 using the wear indication devices 200, and the vessel 102 may be used (e.g., axially rotated) to process (e.g., grind, pulverize, crush, etc.) one or more materials (e.g., ore structures) in an internal chamber 122 thereof. The processing of the materials may degrade (e.g., wear, abrade, etc.) exposed portions of the wear indication devices 200 and wear-resistant structure 120 within the internal chamber 122. After at least one of the wear indication devices 200 exhibits a predetermined amount of wear, a sensor 214 of the wear indication device 200 sends an output (e.g., a wireless transmission, sound, light, etc.) to a receiving device 114, which may then communicate with one or more other devices 116. The communication may be analyzed and further actions, for example, preventive maintenance, may be performed (e.g., the vessel 102 may be shut down, and the wear-resistant structure 120 and the wear indication devices 200 may be replaced), as desired. In addition, one or more of the wear indication devices 200 may be configured and operated to detect and relay other information (e.g., vessel rotation speed, material movement, material composition, etc.) associated with the processing of the material. The additional information may also be analyzed and/or acted upon, as desired.

The devices, assemblies, and methods of the disclosure provide enhanced efficiency, reduced costs, and improved safety as compared to the devices, assemblies, and methods conventionally associated with processing (e.g., grinding, pulverizing, crushing, etc.) a mined material (e.g., ore). For example, the wear indication devices 200, 300, 400, 500 of the disclosure facilitate the simple and cost-effective detection of wear to wear-resistant structures 120 lining a shell 104 of a vessel 102, substantially removing uncertainties regarding the continued durability of the wear-resistant structures 120 during processing of a mined material, mitigating concerns with respect to damage to the vessel 102 during processing of the mined material, and greatly reducing costs (e.g., down time costs, labor costs, damaged equipment costs, etc.) associated with conventional wear inspection processes. The wear indication devices 200, 300, 400, 500 of the disclosure are also easy to produce, to handle, to place, and to secure to components (e.g., the shell 104 of the vessel 102, the wear-resistant structure 120, etc.) of an assembly 100. In addition, the wear indication devices 200, 300, 400, 500 of the disclosure may be configured and operated to provide other useful information (e.g., the rotational velocity of the vessel 102, the movement of materials within the vessel 102, etc.) associated with processing a mined material. Furthermore, the configurations and locations of the wear indication devices 200, 300, 400, 500 may be tailored to particular needs and/or historical data associated with the assembly 100.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A wear indication device, comprising:

an outer body exhibiting an opening extending at least partially therethrough and comprising:

a stem region; and a head region integral with the stem region and extending outwardly beyond a lateral periphery of the stem region; and a passive sensor configured to detect and indicate wear to the outer body and to derive power for one or more components thereof from another device separate and distinct from the passive sensor, the passive sensor positioned within the opening and comprising an output device.

2. The wear indication device of claim 1, wherein the passive sensor further comprises one or more of a pressure sensing module, a temperature sensing module, an audio sensing module, a velocity sensing module, an acceleration sensing module, a radiation sensing module, a moisture sensing module, and a pH sensing module.

3. The wear indication device of claim 1, wherein the passive sensor comprises:

a probe; and an electronic device operatively associated with the probe and comprising the output device.

4. The wear indication device of claim 3, wherein the probe comprises one or more a variable resistance material and a variable capacitance material.

5. The wear indication device of claim 3, wherein the probe comprises an at least partially conductive structure configured and positioned to form an open electrical circuit with the electronic device.

6. The wear indication device of claim 3, wherein the probe comprises an at least partially conductive structure configured and positioned to form a closed electrical circuit with the electronic device.

7. The wear indication device of claim 3, wherein a portion of the electronic device is positioned within the opening, and another portion of the electronic device physically extends beyond boundaries of the opening.

8. The wear indication device of claim 1, wherein the passive sensor further comprises a monitoring device configured and positioned to monitor at least one of a thickness or a volume of the outer body without the use of a probe physically extending into the outer body.

9. The wear indication device of claim 8, wherein the monitoring device comprises an ultrasonic monitoring device configured and positioned to direct an ultrasound signal into the outer body.

10. The wear indication device of claim 8, wherein the monitoring device comprises an ultrasonic monitoring device substantially confined within boundaries of the opening in the outer body and configured to direct an ultrasound signal into the outer body.

11. The wear indication device of claim 1, wherein the output device comprises a radio frequency identification device.

12. The wear indication device of claim 1, wherein the passive sensor is substantially confined within boundaries of the opening in the outer body.

13. The wear indication device of claim 1, wherein the passive sensor is free of an integrated power supply.

14. An assembly comprising:

a vessel comprising a shell;

at least one structure covering at least one internal surface of the shell of the vessel;

one or more wear indication devices extending through and coupling the shell of the vessel and the at least one structure, each of the one or more wear indication devices independently comprising:

an outer body exhibiting an opening extending at least partially therethrough and comprising:

a stem region; and a head region integral with the stem region and extending outwardly beyond a lateral periphery of the stem region; and a passive sensor configured to detect and indicate wear to the outer body and to derive power for one or more components thereof from another device separate and distinct from the passive sensor, the passive sensor positioned within the opening and comprising an output device; and a receiving device positioned and configured to detect and receive output from the output device of at least one of the one or more wear indication devices.

15. The assembly of claim 14, wherein the one or more wear indication devices comprises a plurality of wear indication devices, and the passive sensor of at least one of the plurality of wear indication devices is different than the passive sensor of at least one other of the plurality of wear indication devices.

16. The assembly of claim 14, wherein the passive sensor of at least one of the one or more wear indication devices is configured and positioned to derive power for the one or more components thereof from an interrogation signal generated by the receiving device.

17. The assembly of claim 14, wherein the passive sensor of at least one of the one or more wear indication devices comprises:

an electronic device comprising a wireless transmitter; and a probe operatively associated with the electronic device and selected from the group consisting of a variable resistance structure, an at least partially conductive structure configured to form an open electrical circuit with the electronic device, a wick, and a sealed, at least partially hollow structure.

18. The assembly of claim 14, wherein the passive sensor of at least one of the one or more wear indication devices further comprises an ultrasonic monitoring device.

19. A method of detecting wear to a component of an assembly, comprising:

positioning at least one wear indication device within at least one opening extending through a shell of a vessel and at least one structure covering an internal surface of the shell, the at least one wear indication device comprising:

an outer body exhibiting a recess extending at least partially therethrough and comprising:

a stem region; and a head region integral with the stem region and extending outwardly beyond a lateral periphery of the stem region; and a passive sensor configured to detect and indicate wear to the outer body and to derive power for one or more components thereof from another device separate and distinct from the passive sensor, the passive sensor positioned within the opening and comprising an output device;

at least partially attaching the at least one structure to the vessel using the at least one wear indication device;

removing a portion of the at least one wear indication device responsive to at least one of physical degradation and chemical degradation incurred during processing of a material with the vessel; and producing an output with the sensor of the at least one wear indication device after removing the portion of the at least one wear indication device.

20. The method of claim 19, wherein producing an output with the passive sensor of the at least one wear indication device comprises producing a wireless transmission using the output device of the sensor.

* * * * *